(12) United States Patent
Maitland et al.

(10) Patent No.: US 9,444,913 B2
(45) Date of Patent: Sep. 13, 2016

(54) MULTI-RING RELIABLE MESSAGING SYSTEM

(71) Applicants: Roger J. Maitland, Ottawa (CA); Michael J. Richer, Ottawa (CA)

(72) Inventors: Roger J. Maitland, Ottawa (CA); Michael J. Richer, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 231 days.

(21) Appl. No.: 13/803,558

(22) Filed: Mar. 14, 2013

(65) Prior Publication Data

US 2014/0280700 A1 Sep. 18, 2014

(51) Int. Cl.
*H04L 29/06* (2006.01)
*H04L 12/42* (2006.01)
*H04L 12/437* (2006.01)

(52) U.S. Cl.
CPC .............. *H04L 69/02* (2013.01); *H04L 12/42* (2013.01); *H04L 12/437* (2013.01)

(58) Field of Classification Search
CPC ... H04L 12/42; H04L 12/422; H04L 12/423; H04L 12/427; H04L 12/43; H04L 12/433; H04L 12/437; H04L 2012/421; H04L 69/02
USPC .......... 370/403–405; 709/217, 251, 249, 224
See application file for complete search history.

(56) References Cited

U.S. PATENT DOCUMENTS 4,811,009 A * 3/1989 Orimo et al. .................. 370/403
5,327,431 A * 7/1994 Heske et al. .................. 370/403
5,392,399 A * 2/1995 Gilbrech ....................... 709/245
5,530,808 A * 6/1996 Hammond et al. .......... 709/249
6,483,812 B1 * 11/2002 Prorock ........................ 370/252

(Continued)

FOREIGN PATENT DOCUMENTS

GB      2471761 A      1/2011

OTHER PUBLICATIONS

D.A. Agarwal et al., "The Totem Multiple-Ring Ordering and Topology Maintenance Protocol," ACM Transactions on Computer Systems, vol. 16, No. 2, May 1998, pp. 93-132.

(Continued)

*Primary Examiner* — Joon H Hwang
*Assistant Examiner* — Abdulkader M Alriyashi
(74) *Attorney, Agent, or Firm* — Tong, Rea, Bentley & Kim, LLC

(57) ABSTRACT

A multi-ring reliable messaging system is formed by interconnecting a plurality of token rings via a pair of gateways that includes an active gateway that is configured to communicate with the token rings and a standby gateway that also is configured to communicate with the token rings. The active gateway receives an original message via a first token ring, generates an associated message for a second token ring based on the original message, and propagates the associated message toward the second token ring. The active gateway supports total order delivery of messages within the token rings and causal-order delivery of messages between the token rings. The standby gateway monitors for original and associated messages received via the token rings in a manner for preventing loss of messages when the active gateway fails.

20 Claims, 7 Drawing Sheets

(56) References Cited

U.S. PATENT DOCUMENTS

| | | | |
|---|---|---|---|
| 6,779,038 B1* | 8/2004 | Minyard | H04L 47/10 370/319 |
| 8,345,576 B2 | 1/2013 | Dake | |
| 2003/0012129 A1* | 1/2003 | Lee | H04J 3/085 370/216 |
| 2003/0154315 A1* | 8/2003 | Sultan et al. | 709/251 |
| 2006/0268871 A1* | 11/2006 | Van Zijst | 370/390 |
| 2008/0140892 A1* | 6/2008 | Fong | H04L 12/4637 710/111 |
| 2009/0052317 A1 | 2/2009 | Takagi et al. | |
| 2009/0175166 A1 | 7/2009 | Long et al. | |
| 2010/0074255 A1* | 3/2010 | Harpaz et al. | 370/390 |
| 2010/0098071 A1* | 4/2010 | Zhang | 370/389 |

OTHER PUBLICATIONS

R. R. Koch et al., "The Totem Redundant Ring Protocol," Proceedings 22$^{nd}$ International Conference on Distributed Computing Systems, pp. 598-607, Jul. 2, 2002.

G. Netzer, J. Husman, "The Totem Single-Ring and Secure Ring Protocols an Overview," Department of Microelectronics and Information Technology, Forum, Kista, http://www.imit.kth.se/courses/2G1126/vt03/paper_reports/2g1126-group8.pdf, May 21, 2003.

The International Search Report and the Written Opinion of the International Searching Authority, or The Declaration, mailed Jun. 3, 2014, in PCT/CA2014/050201, Alcatel Lucent, Applicant, 8 pages.

* cited by examiner

US 9,444,913 B2

MULTI-RING RELIABLE MESSAGING SYSTEM

TECHNICAL FIELD

The disclosure relates generally to messaging systems and, more specifically but not exclusively, to handling exchanges of messages in messaging systems.

BACKGROUND

In many types of systems, there is a need for system components to rapidly achieve agreement on the current state of the system via message exchanges. In some such systems, message exchanges are provided using message router solutions (e.g., RabbitMQ) or via use of a token-ring protocol (e.g., the Spread Toolkit or the TOTEM protocol as implemented by corosync). Disadvantageously, however, message router solutions typically face bottleneck conditions as system size increases, and token-ring protocols may scale poorly with system size.

SUMMARY OF EMBODIMENTS

Various deficiencies in the prior art may be addressed by embodiments related to a multi-ring reliable messaging capability.

In one embodiment, an apparatus includes a processor and a memory communicatively connected to the processor, where the processor is configured to receive an original message via a first token ring, determine a second token ring to which the original message is to be provided, generate an associated message for the second token ring based on the original message, and propagate the associated message toward the second token ring.

In one embodiment, a method includes using a processor and a memory for receiving an original message via a first token ring, determining a second token ring to which the original message is to be provided, generating an associated message for the second token ring based on the original message, and propagating the associated message toward the second token ring.

In one embodiment, an apparatus includes a processor and a memory communicatively connected to the processor, where the processor is configured to receive an original message from a first token ring, store the original message in the memory, and monitor for receipt of one or more associated messages associated with the original message from, respectively, one or more other token rings.

In one embodiment, a method includes using a processor and a memory for receiving an original message from a first token ring, storing the original message in the memory, and monitoring for receipt of one or more associated messages associated with the original message from, respectively, one or more other token rings.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

Figure 1:
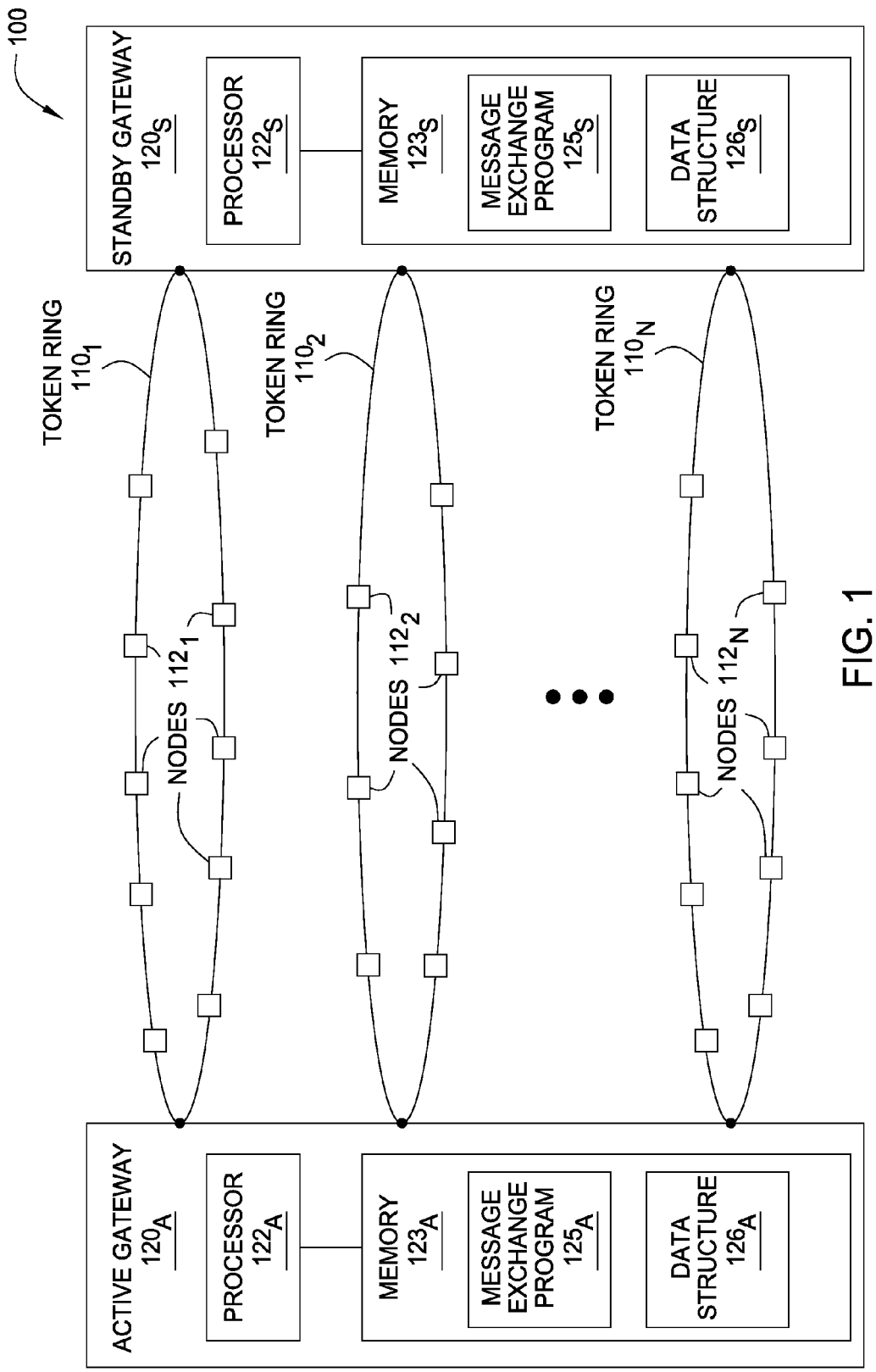
FIG. 1 depicts an exemplary multi-ring messaging system including a plurality of rings and a pair of gateways including an active gateway and a standby gateway.

In general, a multi-ring reliable messaging capability is provided herein. In at least some embodiments, the multi-ring reliable messaging capability may support use of a plurality of interconnected token rings to implement a reliable messaging system, referred to herein as a multi-ring reliable messaging system. It will be appreciated that the plurality of token rings interconnected to implement a reliable messaging system may be a subset of the available token rings (e.g., a subset of the token rings in a system in which the multi-ring reliable messaging capability is provided).

In at least some embodiments, a multi-ring reliable messaging system may be formed by interconnecting a plurality of token rings via a pair of gateways that includes an active gateway that is configured to communicate with each of the plurality of token rings and a standby gateway that also is configured to communicate with each of the plurality of token rings. Here, it will be appreciated that the plurality of token rings may be a select plurality of token rings (e.g., a subset of token rings selected from a set of token rings which are or may be used to provide a multi-ring reliable messaging system).

In at least some embodiments, the active gateway is configured to receive an original message via a first token ring of the plurality of token rings and propagate one or more associated messages toward one or more other token rings for which the original message is intended. In at least some embodiments, the active gateway is configured to receive an original message via a first token ring of the plurality of token rings, determine one or more other token rings to which the original message is to be provided, generate one or more associated messages for the one or more other token rings to which the original message is to be provided, and propagate the one or more associated messages toward the one or more other token rings.

In at least some embodiments, the standby gateway is configured to monitor for original and associated messages received via the token rings in a manner for preventing loss of messages when the active gateway fails. In at least some embodiments, the standby gateway is configured to receive, from a first token ring of a plurality of token rings, an original message generated by a node of the first token ring, store the original message, and monitor for receipt of one or more associated messages, associated with the original message, from one or more other token rings of the plurality of token rings.

In at least some embodiments, message delivery within each of the token rings is performed such that total-order message delivery is provided within each of the token rings, but message delivery between the token rings is relaxed such that total-order message delivery does not need to be supported between the token rings (e.g., only supporting causal-order delivery of messages between token rings). In general, it will be appreciated that delivery of messages with total-order means that messages are delivered to each of the intended recipients (as well as the sender of the message) in the same order. In general, it will be appreciated that delivery of messages with causal-order means that if the sending of a message "a" precedes the sending of a message "b" then the delivery of message "a" occurs before the delivery of message "b".

In at least some embodiments, a multi-ring reliable messaging system is organized such that nodes of the multi-ring reliable messaging system are grouped based on respective node types of the nodes (e.g., for each node type of the nodes of the multi-ring reliable messaging system, the nodes are grouped into one or more token rings for the respective node type). In at least some embodiments, grouping of nodes into the token rings based on node type may be used to ensure that total-order delivery of messages is supported between nodes of the same node type (within the respective token rings) while only causal-order delivery of messages needs to be supported between nodes of different node types (between the token rings). In other words, in at least some embodiments, the multi-ring reliable messaging system may take advantage of the fact that, as system size increases, there is expected to be an associated increase in the likelihood that the system will include groups of nodes that are only interested in subsets of messages generated within the system, such that groups of nodes may be maintained for specific types of messages generated within the system and requirements for total-order delivery of messages across the system may be relaxed such that total-order delivery of messages only may be required within the groups of nodes while causal-order delivery of messages may be supported between the groups of nodes.

In at least some embodiments, a multi-ring reliable messaging system facilitates horizontal scalability while retaining various benefits associated with use of token rings for message delivery (e.g., reliable message delivery, fast reaction times, and the like). It will be appreciated that horizontal scalability overcomes existing limitations of token ring networks in terms of the number of nodes which may be supported (e.g., such as where certain types of token rings may be limited to a maximum of M nodes, and may even be further limited to use of less than M nodes due performance considerations such as message delay and other criteria). For example, in a token ring network limited to M nodes, a multi-ring reliable messaging system including N such token rings may be able to support N×M total nodes (which may be a much larger number of nodes than could otherwise be supported without use of a multi-ring reliable messaging system).

Various embodiments of the multi-ring reliable messaging capability may be better understood by way of reference to an exemplary multi-ring messaging system as depicted and described with respect to FIG. 1.

FIG. 1 depicts an exemplary multi-ring messaging system including a plurality of rings and a pair of gateways including an active gateway and a standby gateway.

The exemplary multi-ring messaging system 100 includes a plurality of token rings $110_1$-$110_N$ (collectively, token rings 110) and a pair of gateways including an active gateway $120_A$ and a standby gateway $120_S$ (collectively, gateways 120). The gateways 120 are each communicatively connected to each of the token rings 110.

The token rings 110 include respective pluralities of nodes $112_1$-$112_M$ (collectively, nodes 112). Within a given token ring 110, the nodes 112 of the token ring 110 are communicatively connected in a ring architecture. The nodes 112 in the token rings 110 may be organized based on the node types of the nodes 110. In at least some embodiments, the token rings 110 and associated nodes 112 may be organized such that, for N node types to be supported within exemplary multi-ring messaging system 100, nodes 112 having the same node type are grouped together to form the token rings $110_1$-$110_N$, respectively (namely, nodes $112_1$ of token ring $110_1$ are nodes of a first node type, nodes $112_2$ of token ring $110_2$ are nodes of a second node type, and so forth). It will be appreciated that, although primarily depicted and described with respect to a one-to-one relationship between nodes types of the nodes 112 and the token rings 110, the token rings 110 and associated nodes 112 may be organized using other arrangements (e.g., multiple node types may be combined within a single token ring 110, nodes of a given node type may be organized into a plurality of token rings 110, or the like, as well as various combinations thereof). It will be appreciated that, in at least some embodiments, nodes 112 of a given node type may only be distributed across multiple token rings 110 if there is not a requirement for total-order delivery of messages to the node 112 of the given node type (e.g., delivery of messages may only be provided in causal-order between nodes 112 of the respective token rings 110 for the node type). Accordingly, it will be appreciated that the numbers of nodes 112 in the token rings 110 may vary across the token rings 110.

The token rings 110 include respective sets of nodes 112. Within a given token ring 110, the nodes 112 of the token ring 110 are configured to generate messages, propagate generated messages to other nodes 112 of the token ring 110, process messages received from other nodes 112 of the token ring 110, forward messages received from other nodes 112 of the token ring 110, and the like. In general, a message generated by a node 112 of a token ring 110 is considered to have originated from that token ring 110 (and may be referred to as an original message of that token ring 110). With a given token ring 110, the nodes 112 of the token ring 110 are configured to support a token ring protocol which facilitates exchanging of messages between the nodes 112 of that token ring 110. For example, each of the nodes 112 of a given token ring 110 may support a single instance of the token ring protocol used for delivery of messages within that token ring 110. Within a given token ring 110, the nodes 112 of the token ring 110 are configured to support total-order delivery of messages within the token ring 110 for messages originating within the token ring 110. The exemplary multi-ring messaging system 100 may support use of one or more token ring protocols supporting total-order message delivery within a token ring (e.g., the TOTEM protocol, the TOTEM protocol as implemented by corosync, the Spread protocol, or any other suitable type of token ring protocol). In at least some embodiments, for example, the same token ring protocol may be used in each of the token rings 110. In at least some embodiments, for example, multiple token ring protocols may be supported such that, while each of the token rings 110 uses one of the multiple token ring protocols, the token ring protocols that are used may vary across the token rings 110.

The token rings 110 also include each of the gateways 120. The gateways 120 each are configured to interface with each of the token rings 110. More specifically, the gateways 120 each are included within the ring architectures of each of the token rings 110, such that each gateway 120 receives each message that is exchanged on each of the token rings 110. In this sense, each gateway 120 appears as a "node" on each token ring 110 (although the presence of the gateways 120 within the token rings 110 may be transparent to the nodes 112 of the token rings 110). The token rings 110 operate independently of each other with the exception of the gateways 120 which integrate the token rings 110 in a manner enabling exchanging of messages between token rings 110. The active gateway $120_A$ and standby gateway $120_S$ may be deployed based on anti-affinity rules in order to ensure (or at least increase the likelihood) that both the active gateway $120_A$ and the standby gateway $120_S$ do not fail at the same time (e.g., using geographic diversity, platform diversity, or the like).

The active gateway $120_A$ includes a processor $122_A$ and a memory $124_A$ that is communicatively connected to processor $122_A$. The memory $124_A$ stores a message exchange program $125_A$ that, when executed by processor $122_A$, causes processor $122_A$ to perform various functions of active gateway $120_A$ as depicted and described herein. The memory $124_A$ also may store a data structure $126_A$ (e.g., a linked list or other suitable type of data structure) which may be used by active gateway $120_A$ if the active gateway $120_A$ functions in a standby role after recovering from a failure in which the standby gateway $120_S$ assumed the role of the active role in response to the failure of the active gateway $120_A$.

The standby gateway $120_S$ includes a processor $122_S$ and a memory $124_S$ that is communicatively connected to processor $122_S$. The memory $124_S$ stores a message exchange program $125_S$ that, when executed by processor $122_S$, causes processor $122_S$ to perform various functions of standby gateway $120_S$ as depicted and described herein. The memory $124_S$ also may store a data structure $126_S$ (e.g., a linked list or other suitable type of data structure) for use in performing various functions of standby gateway $120_S$ as depicted and described herein.

The processors 122 of the gateways 120 each are configured to interface with each of the token rings 110, where such interfacing may be provided in any suitable manner which may depend on the environment or context within which exemplary multi-ring messaging system 100 is used (e.g., using TCP/IP networking, using one or more communication Application Programming Interfaces (APIs), using N dedicated physical interfaces corresponding to respective token rings $110_1$-$110_N$, or the like, as well as various combinations thereof). The processors 122 each may be configured to run one or more instances of one or more token ring protocols to support communication with token rings 110 (e.g., depending on the numbers and types of different token ring protocols used by the token rings 110). For example, where each of the token rings 110 is running corosync, each of the processors 122 may be configured to run N instances of corosync for communication by the associated gateways 120 with the respective token rings $110_1$-$110_N$ (e.g., using N corosync closed process group (CPG) APIs), to run a corosync core that is modified to support multiple simultaneous ring operations on the respective token rings $110_1$-$110_N$, or the like.

The data structure $126_S$ of standby gateway $120_S$ is configured for use in preserving the order of messages for each of the token rings 110. The data structure $126_S$ may be used to store messages received at standby gateway $120_S$ from token rings 110 for messages that originate from the token rings 110. The data structure $126_S$ may be used to track messages received at standby gateway $120_S$ from token rings 110 for messages that do not originate from the token rings 110 on which the messages are received (i.e., messages generated and provided to the token rings by active gateway $120_A$). The data structure $126_S$ may be implemented as or include a linked list(s) or any other type(s) of data structure(s) suitable for use in storing and tracking messages as discussed above.

Thus, for purposes of clarity, interfacing between the processors 122 of the gateways 120 and the token rings 110 is depicted as respective sets of communication paths between the gateways 120 and the respective token rings 110.

The operation of active gateway $120_A$ and standby gateway $120_S$ differs based on their status as being in an active state and a standby state, respectively.

The active gateway $120_A$ is configured to receive an original message from one of the token rings 110 on which the message originated (as noted above, the message was generated by one of the nodes 112 on that token ring 110).

The active gateway $110_A$ is configured to propagate the original message via the one of the token rings 110 on which the original message originated, using the token ring protocol of the one of the token rings 110 on which the original message originated, in a manner for maintaining total-order delivery of the original message within the one of the token rings on which the original message originated. It will be appreciated that this is the typical operation of a token ring when a node that is a member of the token ring receives a message generated by another node on the token ring.

The active gateway $120_A$ also is configured to provide the original message to one or more other token rings 110 to which the original message is to be provided, such that the original message is adequately distributed within exemplary multi-ring messaging system 100. It will be appreciated that references to providing an original message received via one of token rings 110 to one or more other token rings 110 indicates that the information that is conveyed by the original message 110 is to be distributed to other nodes 112 of one or more other token rings 110.

The active gateway $120_A$ is configured to determine the one or more other token rings 110 to which the original message is to be provided. The one or more other token rings 110 to which the original message is to be provided may include all of the other token rings 110 or a subset of the other token rings 110. The active gateway $120_A$ may determine the one or more other token rings 110 to which the original message is to be provided based on one or more address fields of the original message, which may be indicative of one or more of a message type of the original message, a node type of the node 112 from which the original message originated, or the like. For example, where exemplary multi-ring messaging system 100 includes four token rings $110_1$-$110_4$ (i.e., N=4) and an original message originating from a node $112_1$ of token ring $110_1$ and received at active gateway $120_A$ is only of interest to nodes $112_2$ and nodes $112_3$ of token rings $110_2$ and $110_3$ but is not of interest to nodes $112_4$ of token ring $110_4$, the active gateway $120_A$ only provides the original message to token rings $110_2$ and $110_3$ but not to token ring $110_4$, thereby reducing the number of messages that need to be exchanged within exemplary multi-ring messaging system 100. It will be appreciated that the determination of the other token rings 110 to which the original message is to be provided may not be needed where all original messages generated within each of the token rings 110 are to be distributed to all other token rings 110 (e.g., the active gateway $120_A$ may simply know that each of the original messages must be fully distributed).

The active gateway $120_A$ may be configured to provide the original message to the one or more other token rings 110 to which the original message is to be provided using one or more associated messages generated based on the original message. In general, an associated message that corresponds to an original message conveys the same information conveyed by the original message. Thus, the associated message that corresponds to an original message will at least have a payload that includes the same information as the payload of the original message (e.g., in the same format such that the payload of the associated message is identical to the payload of the original message, or in a different format such that the payloads of the associated message and the original message are different but convey the same information) and may even be a duplicate of the original message. For example, where the token rings 110 use different token ring protocols the original message and the one or more associated messages may have identical payloads and different headers. For example, where the token rings 110 use identical token ring protocols and have nodes 112 of the same node type, the one or more associated messages may be identical to the original message. The active gateway $120_A$ may be configured to generate the one or more associated messages in any suitable manner (e.g., retrieving the original message from memory for each instance of the one or more associated messages to be generated based on the original message, generating one or more copies of the original message and modifying the header information of the one or more associated messages if necessary, or the like, as well as various combinations thereof). Therefore, it will be appreciated that, for purposes of tracking distribution of information within the exemplary multi-ring messaging system 100, there is a distinction between an originating message on a token ring 110 (a message generated by a node 112 of that token ring 110) and an associated message on a token ring 110 (a message generated by the active gateway $120_A$ for propagation on that token ring 110). It also will be appreciated that the term "messages" may be used when referring to original and associated messages.

The active gateway $120_A$ may be configured to provide the one or more associated messages to the one or more other token rings 110 to which the original message is to be provided in a manner for maintaining causal-order delivery of the original and associated messages between the token rings 110 for which the original message is intended (namely, the one of the token rings 110 on which the original message is generated and the one or more other token rings 110 for which the original message is intended). The active gateway $120_A$ does not necessarily need to provide the one or more associated messages to the one or more other token rings 110 in a manner for maintaining total-order delivery of the original and associated message between the token rings 110 for which the original message is intended. It will be appreciated that, since messages are received at active gateway $120_A$ from the independent token rings 110 in total order within the respective token rings 110, the associated messages will be provided from active gateway $120_A$ to the token rings 110 in causal order. In at least some embodiments, however, causal-order delivery of messages between the token rings 110 may result in message re-ordering situations in which messages are observed on a token ring 110 in a different order than the order in which they occur on other token rings 110. This type of message re-ordering may or may not be problematic, depending on one or more of the type(s) of messages being delivered, the types of nodes of the token rings 110, the type(s) of token ring protocol(s) of the token rings 110, or the like. For example, total order of state change notification (SCN) messages within a distributed management application may not be required, whereas total order of database update messages within a database system may be required. Accordingly, in at least some embodiments, one or more message re-ordering mechanisms may be used to cope with potential re-ordering of messages between different token rings 110.

Figure 2:
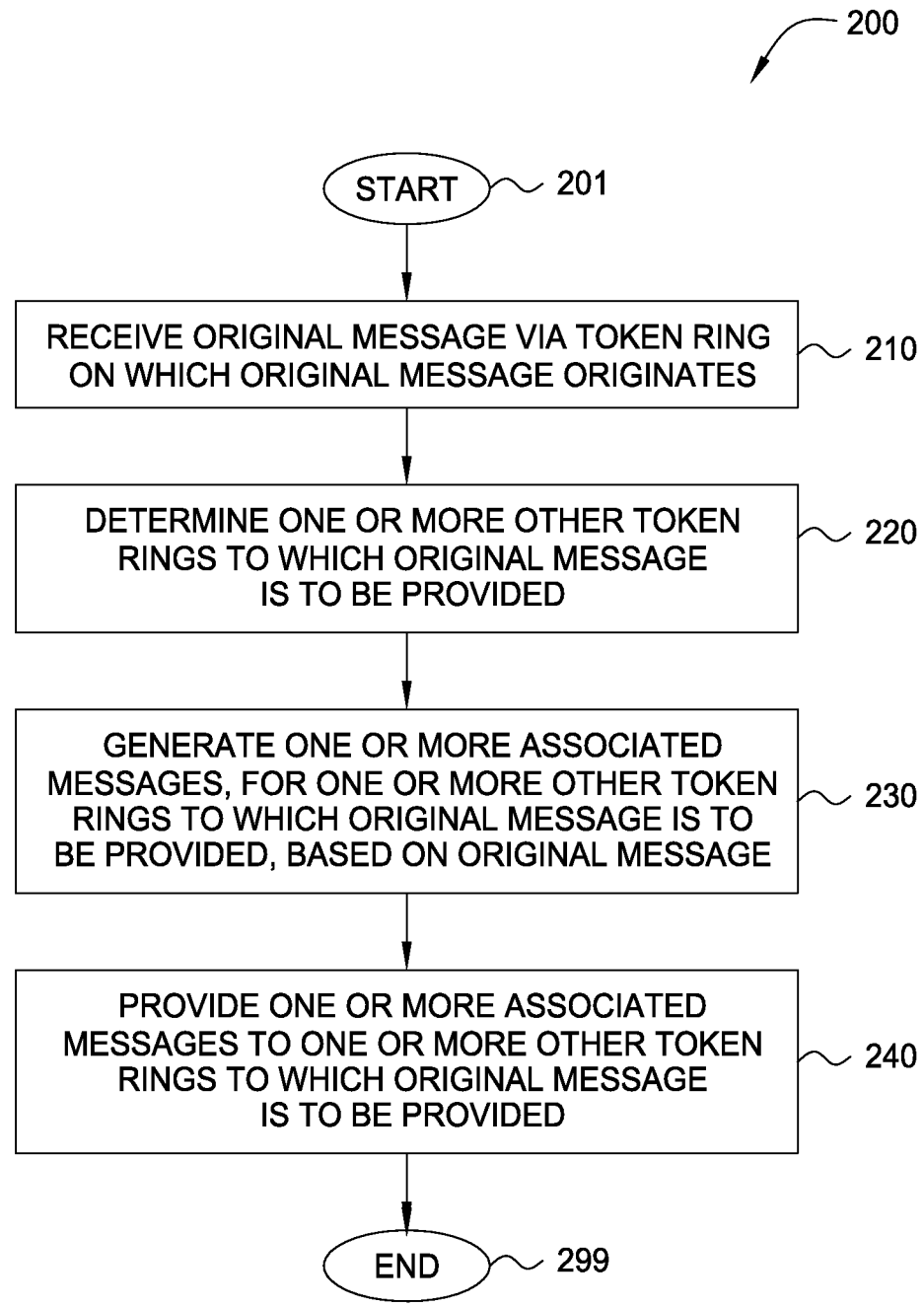
FIG. 2 depicts an exemplary embodiment of a method for use by the active gateway of FIG. 1 to handle a message originating from one of the token rings of FIG. 1.

An exemplary embodiment of a method which may be executed by processor $122_A$ of active gateway $120_A$ is depicted and described with respect to FIG. 2. It will be appreciated that any other combinations of functions depicted and described herein may be implemented as one or more processes configured for execution by processor $122_A$ of active gateway $120_A$.

The standby gateway $120_S$ is configured to ensure that messages are not lost if the active gateway $120_A$ fails. The standby gateway $120_S$ receives the same messages that are received by active gateway $120_A$ (as they are both members of all of the token rings 110), which include original messages that originate on the token rings 110 and associated messages that are generated by the active gateway $120_A$ and provided to the token rings 110 by the active gateway $120_A$.

The standby gateway $120_S$ receives a message from one of the token rings. The standby gateway $120_S$ determines whether the message is an original message (which originated on the token ring 110 via which the message was received) or an associated message (generated by active gateway $120_A$ based on an original message that originated on a token ring 110 other than the token ring 110 on which the message was received and was provided to the token ring 110 on which the message was received by active gateway $120_A$). The standby gateway $120_S$ may determine whether the message is an original message or an associated message based on whether or not a version of the message is currently stored on standby gateway $120_S$ (namely, if a version of the message is not currently stored on standby gateway $120_S$ then the message is identified as an original message, otherwise the message is identified as an associated message). The determination as to whether a version of the message is currently stored on standby gateway $120_S$ may be performed based on whether or not a version of the message is stored in memory $124_S$ of standby gateway $120_S$.

The standby gateway $120_S$, in response to receiving an original message via a token ring 110, stores the original message in memory $124_S$ (e.g., by adding the original message to the data structure $126_S$), determines one or more other token rings 110 to which the original message is to be provided (e.g., all of the other token rings 110 or an appropriate subset of the other token rings 110), monitors for receipt of one or more associated messages from the one or more other token rings 110 to which the original message is to be provided, and removes the original message from memory $124_S$ (e.g., by removing the original message from the data structure $126_S$) based on a determination that the one or more associated messages which correspond to the original message have been received at standby gateway $120_S$ from each of the other token rings 110 to which the original message is to be provided. The standby gateway $120_S$ may determine the one or more other token rings 110 to which the original message is to be provided in a manner similar to that of the active gateway $120_A$ (e.g., based on one or more address fields of the message, which may be indicative of one or more of a message type of the message, a node type of the node 112 from which the message originated, or the like). The identification of the one or more other token rings 110 to which the original message is to be provided provides an indication as to one or more other token rings 110 from which the standby gateway 120$_S$ may expect to receive one or more associated messages associated with the original message.

The standby gateway 120$_S$, in response to receiving an associated message via a token ring 110, identifies an original message with which the associated message is associated and updates message tracking information associated with the original message. The message tracking information may include (1) information indicative as to which of the one or more associated messages expected to be received by standby gateway 120$_S$ for the original message have in fact been received by standby gateway 120$_S$ (e.g., a list of the one or more other token rings 110 to which the original message is to be provided is created when the original message is received by standby gateway 120$_S$ and entries are removed from the list as the associated messages are received from the one or more other token rings 110 to which the original message is to be provided) or (2) information indicative as to which of the one or more associated messages expected to be received by standby gateway 120$_S$ for the original message have not yet been received by standby gateway 120$_S$ (e.g., a list of the one or more other token rings 110 to which the original message is to be provided is initialized to be empty when the original message is received by standby gateway 120$_S$ and entries are added to the list as the one or more associated messages are received from the one or more other token rings 110 to which the original message is to be provided). The standby gateway 120$_S$, in response a determination that the original message has been received from each of the one or more other token rings 110 to which the message is expected to be provided (via the one or more associated messages), terminates message tracking for the original message.

In this manner, standby gateway 120$_S$ is able to maintain a snapshot of which of the messages generated within exemplary multi-ring messaging system 100 (namely, original messages generated by nodes 112 of token rings 110 and associated messages generated by the active node 120$_A$) have been fully distributed within exemplary multi-ring messaging system 100, such that standby gateway 120$_S$ can ensure that messages are not lost if the active gateway 120$_A$ fails.

The standby gateway 120$_S$, based on a determination that active gateway 120$_A$ has failed, determines which associated messages still need to be delivered within exemplary multi-ring messaging system 100 at the time that the active gateway 120$_A$ failed. The standby gateway 120$_S$ may determine which associated messages still need to be delivered by: (1) determining which original messages are still stored in memory 124$_S$, and (2) for each original message still stored in memory 124$_S$: determining which of the one or more other token rings 110 to which the original message is to be provided but via which the standby gateway 120$_S$ has not yet received the associated one or more associated messages from the one or more other token ring(s) 110, and providing one or more associated messages to one or more other token rings 110 to which the original message is to be provided but via which the standby gateway 120$_S$ has not yet received the associated one or more associated messages from the one or more other token ring(s) 110.

The standby gateway 120$_S$ may use the data structure 126$_S$ to support such associated message tracking and distribution functions. For example, the standby gateway 120$_S$ may (1) when an original message is received, add, to the data structure 126$_S$, one or more entries for the one or more other token rings 110 to which the associated one or more associated messages are to be provided (e.g., where the original message is stored x times in the x entries for the x token rings 110 to which the original message is to be provided using x associated message, or where the original message is stored one time for the x entries for the x token rings 110 to which the original message is to be provided and the x entries each include a pointer to the stored original message which is to be provided using x associated message), respectively, and (2) remove the one or more entries from the data structure 126$_S$ as the one or more associated messages associated with the original message are received via the one or more other token rings 110 to which the original message is to be provided. Similarly, for example, the standby gateway 120$_S$ may perform a reverse process of adding entries for the one or more other token rings 110 to which the original message is to be provided as the one or more associated messages associated with the original message are received via the one or more other token rings 110 to which the original message is to be provided. In either case, the standby gateway 120$_S$ is able to monitor and track distribution of associated messages within exemplary multi-ring messaging system 100. It will be appreciated that the data structure 126$_S$ may be implemented as a linked list or using any other type of data structure suitable for use in monitoring for and tracking receipt of associated message from each of the other token ring(s) 110 to which the message is to be provided.

In this manner, standby gateway 120$_S$, by performing such functions for each message originating on each of the token rings 110, is able to ensure that messages are not lost if the active gateway 120$_A$ fails (e.g., for each of one or more original messages for which the active gateway 120$_A$ received the message from the one of the token rings 110 on which the original message originated but failed before providing the original message to each of the one or more other token rings 110 to which the original message is to be provided).

Figure 3:
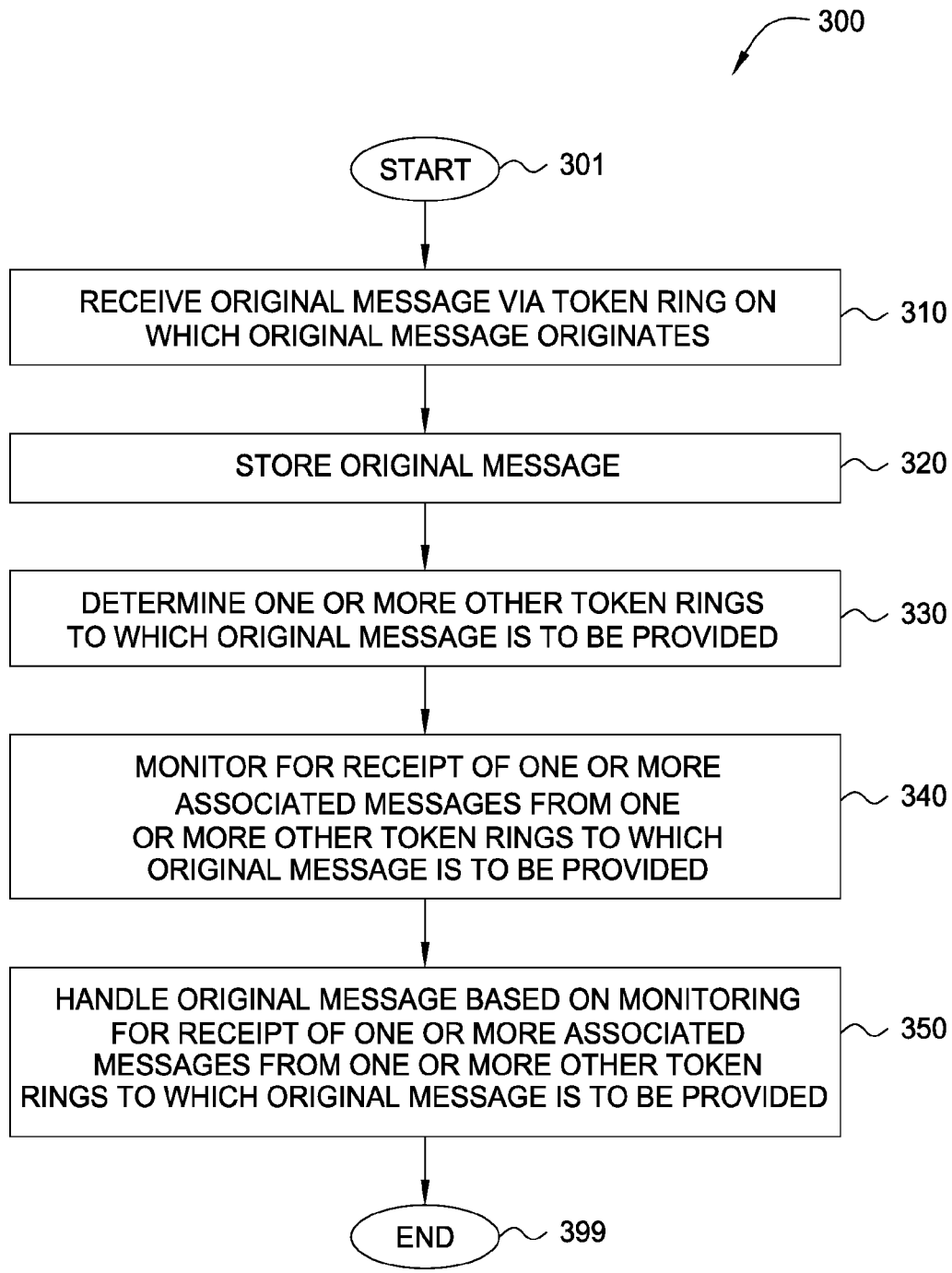
FIG. 3 depicts an exemplary embodiment of a method for use by the standby gateway of FIG. 1 to handle a message originating from one of the token rings of FIG. 1.

An exemplary embodiment of a method which may be executed by processor 122$_S$ of standby gateway 120$_S$ is depicted and described with respect to FIG. 3. It will be appreciated that any other combinations of functions depicted and described herein may be implemented as one or more processes configured for execution by processor 122$_S$ of standby gateway 120$_S$.

As noted herein, the exemplary multi-ring messaging system 100 may be implemented within various types of environments and contexts and, thus, implementation of various elements of exemplary multi-ring messaging system 100 (e.g., nodes 112, communication between nodes 112 within token rings 110, gateways 120, or the like) may vary with the types of environments and contexts.

In at least some embodiments, for example, exemplary multi-ring messaging system 100 may be used to support an application in a cloud environment. In at least some such embodiments, for example, the nodes 112 may be virtual machines (VMs) hosted within one or more cloud data centers, communication between the nodes 112 within the token rings 110 may be performed using Internet Protocol (IP) based networking, the gateways 120 may be VMs hosted within one or two cloud data centers (e.g., hosted on different hosts within a single data center, hosted in geographically distributed data centers, or the like), and the messages may include state change notifications. In at least some such embodiments, the application may be a carrier grade telecommunications application, a cloud-based file system, an online shopping application, or the like. An exemplary embodiment of a multi-ring messaging system configured to support cloud-based management of a Third Generation Radio Access Network (RAN) is depicted and described with respect to FIGS. 5-6.

In at least some embodiments, for example, exemplary multi-ring messaging system 100 may be used within a server device. In at least some such embodiments, for example, the nodes 112 may be server blades of the server device, communication between the nodes 112 within the token rings 110 may be performed using internal communications buses, the gateways 120 may be dedicated cards of the server device, and the messages may include state change notifications.

In at least some embodiments, for example, exemplary multi-ring messaging system 100 may be used within a database system. In at least some such embodiments, for example, the nodes 112 may be processors responsible for management of respective portions of the database system, communication between the nodes 112 within the token rings 110 may be performed using any suitable types of communication paths (e.g., internal communication paths, networked communication paths, or the like), the gateways 120 may be dedicated processors of the database system, and the messages may include database update instructions.

It will be appreciated that the foregoing examples provide merely a few of the various environments and contexts within which embodiments of the exemplary multi-ring messaging system 100 may be implemented.

FIG. 2 depicts an exemplary embodiment of a method for use by the active gateway of FIG. 1 to handle a message originating from one of the token rings of FIG. 1. It will be appreciated that, although primarily depicted and described as being performed serially, at least a portion of the steps of method 200 may be performed contemporaneously or in a different order than depicted in FIG. 2. At step 201, method 200 begins. At step 210, an original message originating from a token ring is received via the token ring. At step 220, one or more other token rings to which the original message is to be provided are determined. At step 230, one or more associated messages are generated, for the one or more other token rings to which the original message is to be provided, based on the original message (e.g., generating one or more new payloads based on the payload of the original message, including the payload of the original message, as one or more copies of the original message, or the like). At step 240, the one or more associated messages are provided to the one or more other token rings to which the original message is to be provided. At step 299, method 200 ends. It will be appreciated that the operation of method 200 of FIG. 2 may be better understood when read in conjunction with FIG. 1.

FIG. 3 depicts an exemplary embodiment of a method for use by the standby gateway of FIG. 1 to handle a message originating from one of the token rings of FIG. 1. It will be appreciated that, although primarily depicted and described as being performed serially, at least a portion of the steps of method 300 may be performed contemporaneously or in a different order than depicted in FIG. 3.

At step 301, method 300 begins.

At step 310, an original message is received via a token ring on which the original message originated.

At step 320, the original message is stored. The original message is stored for later use in distributing the original message via one or more token rings, if necessary, when an active gateway associated with the standby gateway fails.

At step 330, one or more other token rings to which the original message is to be provided are determined. The one or more other token rings represent the one or more token rings from which the standby gateway expects to receive one or more associated messages to be generated by the active gateway for distributing the information of the original message to the one or more other token rings.

At step 340, monitoring for receipt of the one or more associated messages from the one or more other token rings is performed. The monitoring includes tracking which of the one or more other token rings via which the one or more associated messages have been received. The tracking of which of the one or more other token rings via which the one or more associated messages have been received may be performed using a data structure.

At step 350, the original message is handled based on the monitoring for receipt of the one or more associated messages from the one or more other token rings. If each of the one or more associated messages is received at the standby gateway before an active gateway associated with the standby gateway fails, the original message is removed from the standby gateway and monitoring for the one or more associated messages is terminated. If at least one of the one or more associated messages is not received at the standby gateway before an active gateway associated with the standby gateway fails, the original message is provided to any of the one or more other token rings to which the original message is to be provided but from which the associated message has not been received (e.g., using one or more associated messages associated with the original message, in a manner similar to the active gateway). In this manner, complete and reliable delivery of the original message may be assured even when the active gateway fails.

At step 399, method 300 ends.

Figure 4:
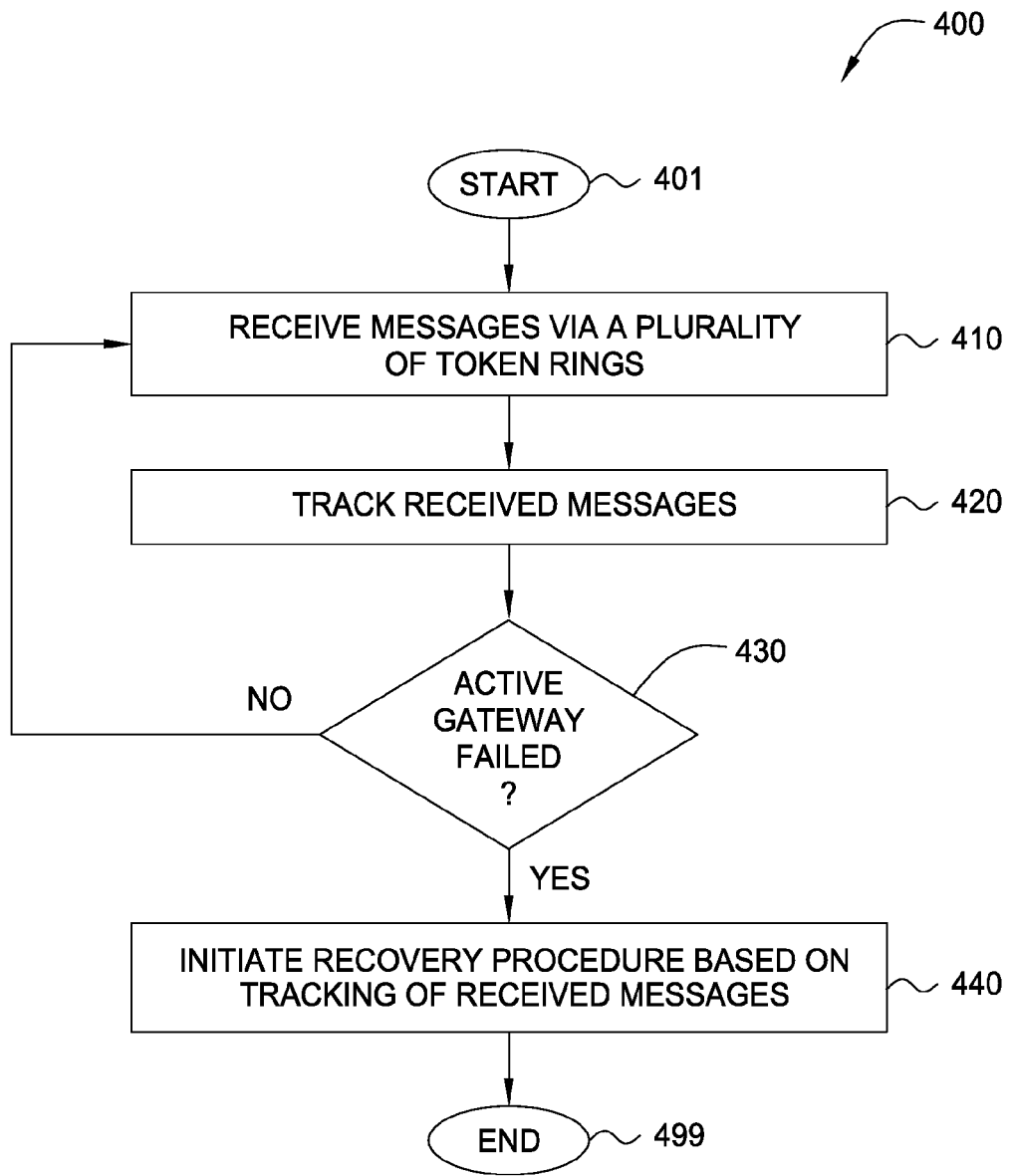
FIG. 4 depicts an exemplary embodiment of a method for use by the standby gateway of FIG. 1 to handle messages originating from the token rings of FIG. 1.

FIG. 4 depicts an exemplary embodiment of a method for use by the standby gateway of FIG. 1 to handle messages originating from the token rings of FIG. 1. It will be appreciated that, although primarily depicted and described as being performed serially, at least a portion of the steps of method 400 may be performed contemporaneously or in a different order than depicted in FIG. 4.

At step 401, method 400 begins.

At step 410, messages are received via a plurality of token rings. The messages may include original messages received via the token rings on which the message originate or associated messages received via token rings other than the token rings on which the associated original messages originate (e.g., distributed on the token rings by an active gateway that is associated with the standby gateway).

At step 420, the received messages are tracked. For each original message received via the token ring, tracking for the original message includes determining one or more other token rings to which the original message is to be provided and tracking which of the one or more other token rings to which the original message is to be provided from which the original message (e.g., in the form of one or more associated messages that are generated based on the original message) is received. For each associated message received via the token ring, tracking for the associated message includes identifying the original message with which the associated message is associated and marking that the associated message for that original message has been received via that token ring. In at least some embodiments, tracking of the received messages may be performed using a data structure of the standby gateway.

At step 430, a determination is made as to whether the active gateway has failed. If the active gateway has not failed, method 400 returns to step 410 (i.e., the method 400 continues to operate with the standby gateway continuing to receive messages via the token rings and track the messages received via the token ring). If the active gateway has failed, method 400 proceeds to step 440.

At step 440, a recovery procedure is initiated based on the tracking of the received messages. The recovery procedure includes identifying each original message for which distribution of the original message using one or more associated messages is incomplete (namely, one or more associated messages have not been received via each of the one or more other token rings to which the original message is to be provided) and, for each original message for which distribution of the original message using one or more associated messages is incomplete, providing the original message to one or more other token rings using one or more associated messages in a manner for competing distribution of the original message.

At step 499, method 400 ends.

Figure 5:
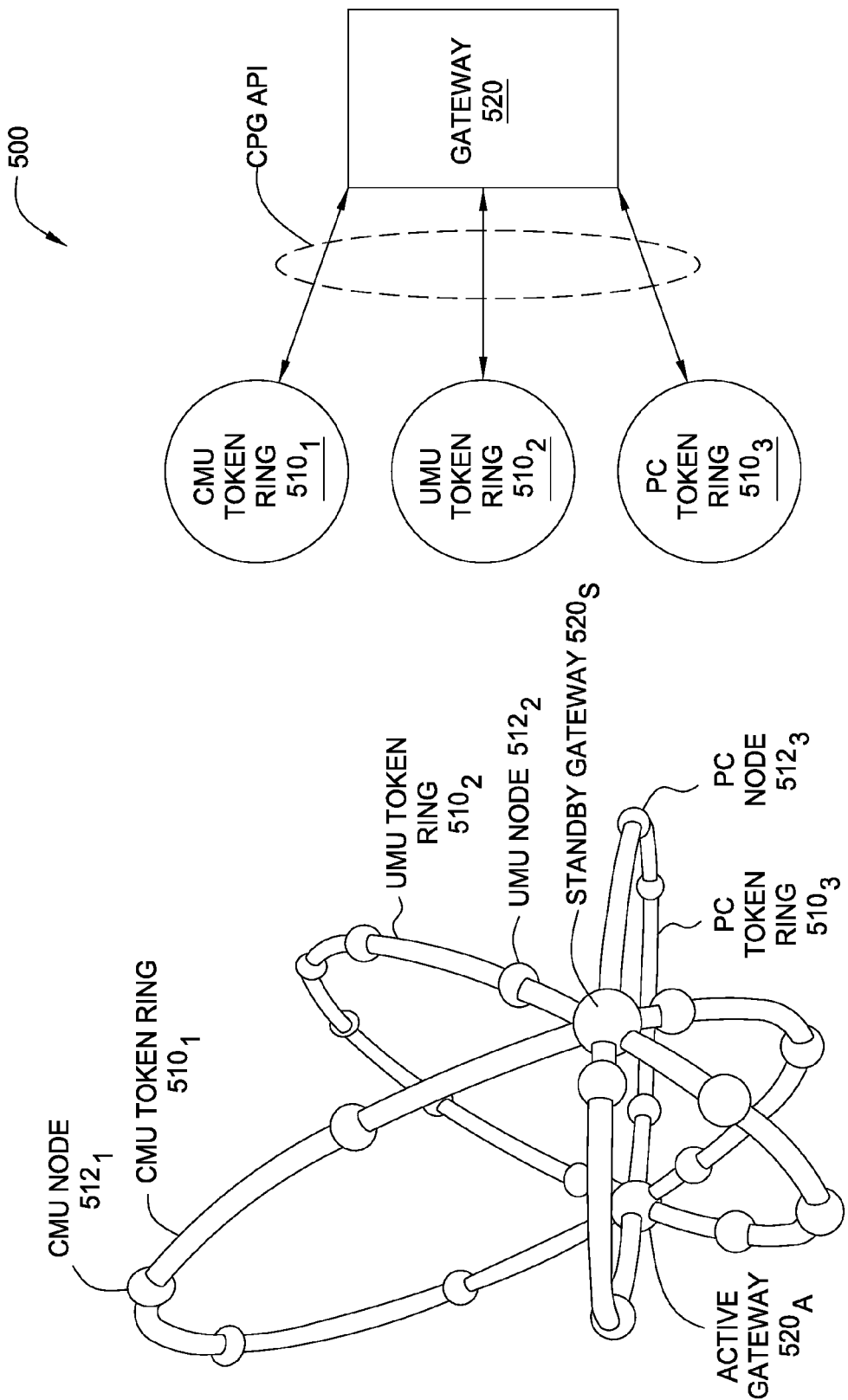
FIG. 5 depicts an exemplary embodiment of a multi-ring messaging system for a cloud-based radio access network management application.
Figure 6:
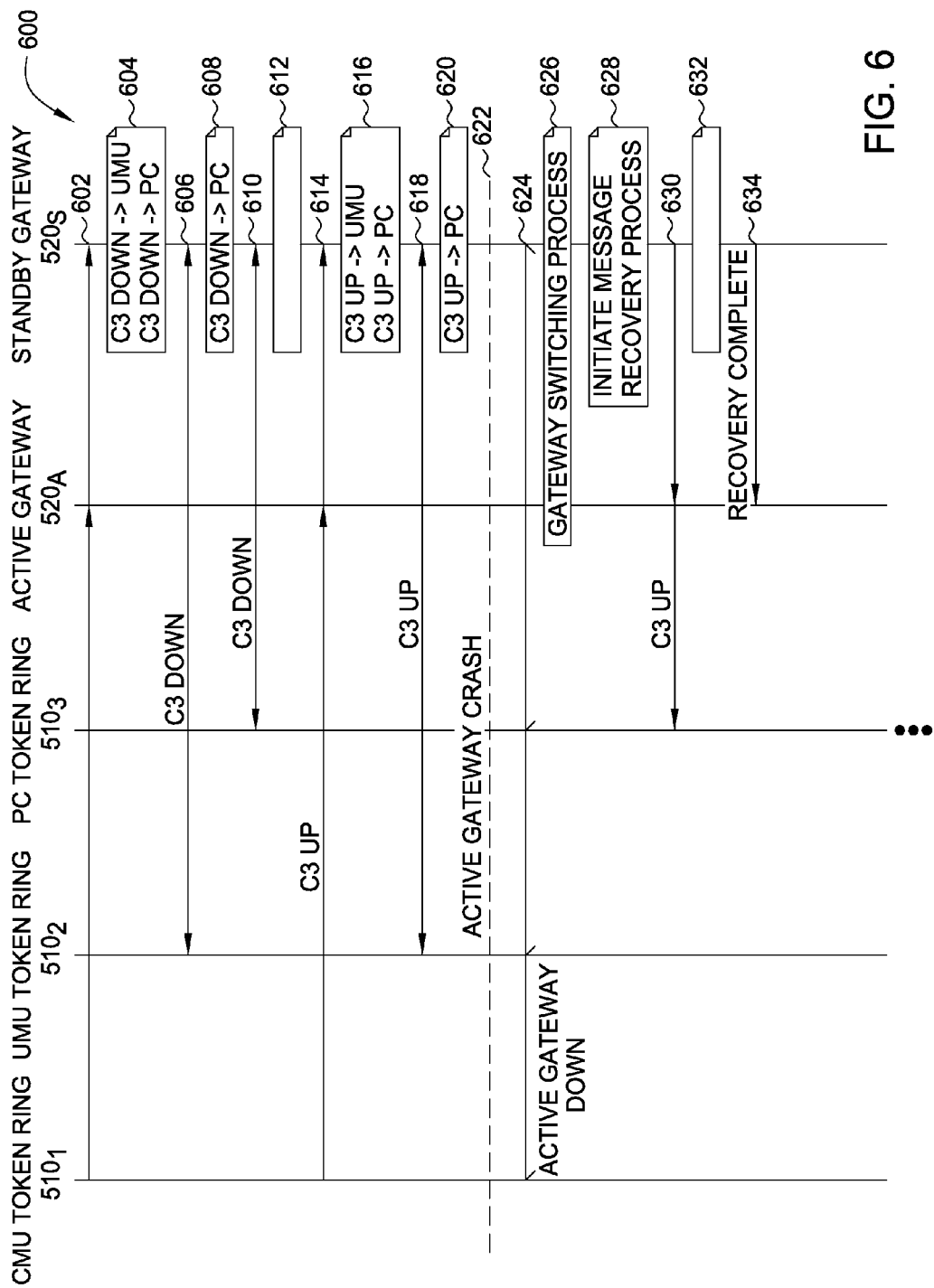
FIG. 6 depicts an exemplary message flow for the exemplary multi-ring messaging system of FIG. 5.

Various embodiments of the multi-ring reliable messaging capability may be better understood by considering an exemplary embodiment of a multi-ring messaging system for a cloud-based radio access network management application, as depicted and described with respect to FIGS. 5 and 6.

FIG. 5 depicts an exemplary embodiment of a multi-ring messaging system for a cloud-based radio access network management application.

The exemplary multi-ring messaging system 500 supports exchanging of state change notification (SCN) messages related to management of a radio access network (RAN) including a multitude of cell sites providing cellular access for wireless user devices (e.g., a multitude of NodeBs providing cellular access for User Equipments (UEs)). The SCN messages are primarily used to communicate the state of virtual machines (VMs) used to provide a cloud-based implementation of a Radio Network Controller (RNC) of a RAN. The VMs provide specific functions of the RNC, including cell management functions (provided by CMU VMs), user equipment management functions (provided by UMU VMs), and protocol conversion functions (provided by PC VMs). For example, the SCN messages may be messages related to cell site events (e.g., cell sites going down, cell sites coming back up), related to wireless user devices impacted by cell site events, related to backhaul equipment supporting transport of traffic between the cell sites and the wireless core network, or the like.

The exemplary multi-ring messaging system 500 includes three token rings 510 as follows: a CMU token ring $510_1$ composed of a plurality of CMU nodes $512_1$ (representing the respective CMU VMs) configured to monitor the status of and control cell sites, a UMU token ring $510_2$ composed of a plurality of UMU nodes $512_2$ (representing the respective UMU VMs) configured to monitor and control wireless user devices supported by the cell sites, and a PC token ring $510_3$ composed of a plurality of PC nodes $512_3$ (representing the respective PC VMs) configured to act as network gateways isolating the private network within the cloud and the public network hosting the cell sites and core network components. The CMU token ring $510_1$, UMU token ring $510_2$, and PC token ring $510_3$ may be referred to collectively as token rings 510 and, similarly, the CMU nodes $512_1$, UMU nodes $512_2$, and PC nodes $510_3$ may be referred to collectively as nodes 512.

The exemplary multi-ring messaging system 500 also includes an active gateway $520_A$ and a standby gateway $520_S$, each of which participates within each of the token rings 510. The active gateway $520_A$ and a standby gateway $520_S$ also are implemented using VMs, respectively. The active gateway $520_A$ and a standby gateway $520_S$ provide a reliable messaging service across all of the nodes 512 of the token rings 510. For example, exemplary multi-ring messaging system 500 may be configured to operate as depicted and described with respect to exemplary multi-ring messaging system 100. The operation of exemplary multi-ring messaging system 500 may be better understood by considering an exemplary message flow for exemplary multi-ring messaging system 500, as depicted and described with respect to FIG. 6.

FIG. 6 depicts an exemplary message flow for the exemplary multi-ring messaging system of FIG. 5. It will be appreciated that, although primarily depicted and described as being performed serially, at least a portion of the steps of exemplary message flow 600 may be performed contemporaneously or in a different order than depicted in FIG. 6.

As depicted in FIG. 6, each of the elements of FIG. 5 participates in the exemplary message flow (namely, token ring $510_1$ having CMU nodes (denoted as CMU token ring $510_1$), token ring $510_2$ having UMU nodes (denoted as UMU token ring $510_2$), token ring $510_3$ having PC nodes (denoted as PC token ring $510_3$), active gateway $520_A$, and standby gateway $520_S$.

At step 602, CMU token ring $510_1$ sends a message (denoted as C3 DOWN) indicating that node C3 of the CMU token ring $510_1$ has gone down. The C3 DOWN message is received by both active gateway $520_A$ and standby gateway $520_S$.

At step 604, standby gateway $520_S$ determines that the C3 DOWN message needs to be distributed to both UMU token ring $510_2$ and PC token ring $510_3$. The standby gateway $520_S$ adds to its data structure two entries indicating that the C3 DOWN message needs to be distributed to both UMU token ring $510_2$ (denoted as entry C3 DOWN→UMU) and PC token ring $510_3$ (denoted as C3 DOWN→PC).

At step 606, active gateway $520_A$, based on a determination that the C3 DOWN message needs to be distributed to UMU token ring $510_2$, propagates the C3 DOWN message to UMU token ring $510_2$.

At step 608, standby gateway $520_S$ receives the C3 DOWN message via UMU token ring $510_2$ and updates its data structure to reflect receipt of the C3 DOWN message via UMU token ring $510_2$ (illustratively, by removing the C3 DOWN→UMU entry from the data structure, leaving only the C3 DOWN→PC entry in the data structure for the C3 DOWN message).

At step 610, active gateway $520_A$, based on a determination that the C3 DOWN message also needs to be distributed to PC token ring $510_3$, propagates the C3 DOWN message to PC token ring $510_3$.

At step 612, standby gateway $520_S$ receives the C3 DOWN message via PC token ring $510_3$ and updates its data structure to reflect receipt of the C3 DOWN message via PC token ring $510_3$ (illustratively, by removing the C3 DOWN→PC entry from the data structure, such that the data structure no longer includes any entries for the C3 DOWN message).

At step 614, CMU token ring $510_1$ sends a message (denoted as C3 UP) indicating that node C3 of the CMU token ring $510_1$ has come back up. The C3 UP message is received by both active gateway $520_A$ and standby gateway $520_S$.

At step 616, standby gateway $520_S$ determines that the C3 UP message needs to be distributed to both UMU token ring $510_2$ and PC token ring $510_3$. The standby gateway $520_S$ adds to its data structure two entries indicating that the C3 UP message needs to be distributed to both UMU token ring $510_2$ (denoted as entry C3 UP→UMU) and PC token ring $510_3$ (denoted as C3 UP→PC).

At step 618, active gateway $520_A$, based on a determination that the C3 UP message needs to be distributed to UMU token ring $510_2$, propagates the C3 UP message to UMU token ring $510_2$.

At step 620, standby gateway $520_S$ receives the C3 UP message via UMU token ring $510_2$ and updates its data structure to reflect receipt of the C3 UP message via UMU token ring $510_2$ (illustratively, by removing the C3 UP→UMU entry from the data structure, leaving only the C3 UP→PC entry in the data structure for the C3 UP message).

At step 622, active gateway $520_A$ fails. At this time, the data structure of standby gateway $520_S$ still includes the C3 UP→PC entry for the C3 UP message.

At step 624, CMU token ring $510_1$, UMU token ring $510_2$, PC token ring $510_3$, and standby gateway $520_S$ detect that active gateway $520_A$ has failed.

At step 626, a gateway switching process is initiated to enable standby gateway $520_S$ to begin operating as the active gateway for exemplary multi-ring messaging system 500 and to enable active gateway $520_A$ to begin operating as the spare gateway for exemplary multi-ring messaging system 500 after active gateway $520_A$ recovers from its failure.

At step 628, standby gateway $520_S$ initiates a message recovery process based on its data structure, which represents the set of messages which should have been, but were not, propagated by active gateway $520_A$ before failing. In the exemplary message flow 600, the data structure of standby gateway $520_S$ still includes the C3 UP→PC entry for the C3 UP message, which indicates to standby gateway $520_S$ that active gateway $520_A$ did not propagate the C3 UP message via PC token ring $510_3$ before failing.

At step 630, standby gateway $520_S$, based on a determination from its data structure that the C3 UP message still needs to be distributed to PC token ring $510_3$, propagates the C3 UP message to PC token ring $510_3$.

At step 632, standby gateway $520_S$ updates its data structure to reflect propagation of the C3 UP message via PC token ring $510_3$ (illustratively, by removing the C3 UP→PC entry from the data structure, such that the data structure no longer includes any entries for the C3 DOWN message). As depicted at step 632, the data structure of standby gateway $520_S$ is now empty (i.e., the message recovery process is complete).

At step 634, standby gateway $520_S$ sends a message recovery process complete message to active gateway $520_A$ (which, as noted above, now operates as the spare gateway for exemplary multi-ring messaging system 500). The exemplary multi-ring messaging system 500 then continues to function as depicted and described with respect to steps 602-620, but with the active/spare roles of active gateway $520_A$ and standby gateway $520_S$ reversed, so as to support reliable message delivery for the nodes 512 of the exemplary multi-ring messaging system 500.

As described herein, exemplary multi-ring messaging system 500 associated with exemplary message flow 600 may support total-order delivery of messages within the token rings 510 while only supporting causal-order delivery of messages between the token rings 510, which may result in message re-ordering situations in which messages are observed on a token ring 510 in a order that is different than the order in which they occur on other token rings 510. For example, it is possible that the occurrence of an event U1 on UMU token ring $510_2$ may happen prior to the occurrence of an event P1 on PC token ring $510_3$, but that the messages reporting events U1 and P1 may be observed on CMU token ring $510_1$ in the reverse order (namely, P1, U1). While there should be no consequence to this type of re-ordering for the type of messages delivered within exemplary multi-ring messaging system 500 (namely, SCN messages), this type of re-ordering may be problematic for embodiments in which exemplary multi-ring messaging system 100 is implemented within other types of networks, system, environments, or the like. Accordingly, in at least some embodiments, one or more message re-ordering mechanisms may be used to cope with potential re-ordering of messages.

It will be appreciated that references herein to propagating a message toward a token ring may considered to include various actions which may be performed by a device to send the message toward the token ring such that the message is received by the token ring (namely, by one or more nodes of the token ring). Similarly, it will be appreciated that references herein to providing a message toward a token ring may considered to include various actions which may be performed by a device to propagate or send the message toward the token ring such that the message is received by the token ring.

It will be appreciated that use of the multi-ring messaging capability allows most of the benefits of a token-ring protocol (e.g., TOTEM) to apply to a large system (e.g., as compared to existing messaging systems which do not support use of multiple token-rings as depicted and described herein. For example, various embodiments of the multi-ring messaging capability allow an application to benefit from one or more of safe delivery of messages (e.g., either all or none of the nodes receive messages), delivery of messages in casual order (e.g., it is not possible for a node-up notification to precede the casual node-down notification), robustness (e.g., the system continues to provide service in the event of any node failure, including failure of the active gateway via switchover to the standby gateway), continued use of standard best-effort messaging services (e.g., no custom interconnect technology is required), improved performance (e.g., not only are larger systems possible, but use of multiple smaller rings provides significant reductions in message latency as token circulation time is substantially reduced).

It will be appreciated that, although omitted for purposes of clarity, in at least some embodiments a coordination capability is provided to ensure that both of the gateways see the original message on the original token ring on which it was generated and see any duplicate messages on the other token ring(s) on which the original message is distributed. In at least some embodiments, in order to ensure that the standby gateway does not begin populating its data structure with messages prior to establishment of coordination between the active gateway and the standby gateway, a broadcast coordination message is sent by the standby gateway to all of the token rings and, as the standby receives the coordination message on each of the token rings, the standby gateway will begin recording messages received via the token rings, respectively. It will be appreciated that this coordination capability may be used when a standby gateway is initialized or following recovery of a failed gateway (e.g., where the formerly active gateway comes back up and assumes its role as a standby gateway).

It will be appreciated that, although primarily depicted and described with respect to embodiments in which the active gateway is configured to perform one set of functions (active gateway functions) and the standby gateway is configured to perform another set of functions (standby gateway functions), in at least some embodiments both the active gateway and the standby gateway each may be configured to perform active gateway functions and standby gateway functions (e.g., such that the gateways may switch between the active state and the standby state as necessary in order to ensure delivery of messages within and between the token rings to which the gateways are connected).

It will be appreciated that, although primarily depicted and described with respect to embodiments in which a gateway (i.e., active gateway and standby gateway) is a dedicated node that is provided in addition to the nodes of the token rings to which the gateway is connected, in at least some embodiments the functions of a gateway may be provided by any node that is a member of all of the token rings (e.g., an existing node that is a member of all of the token rings).

It will be appreciated that, although primarily depicted and described with respect to embodiments in which the token rings are interconnected by an active gateway and a standby gateway, in at least some embodiments the token rings may be interconnected by only a single (active) gateway and the standby gateway may be omitted. It will be appreciated that, when only a single gateway interconnects the token rings, causal-order delivery of messages between the token rings may still be ensured.

It will be appreciated that, although primarily depicted and described with respect to exemplary embodiments in which each of the token rings of a messaging system are used, a messaging system may include one or more additional rings. Thus, in at least some embodiments, references herein to each of the rings may be considered to be references to a subset of the rings of a messaging system (or, more generally, a subset of a plurality of rings). Similarly, it will be appreciated that, although primarily depicted and described with respect to exemplary embodiments in which various characteristics of a given token ring apply to each of the nodes of the given token ring, one or more groups of nodes of the token ring may include one or more different characteristics.

Figure 7:
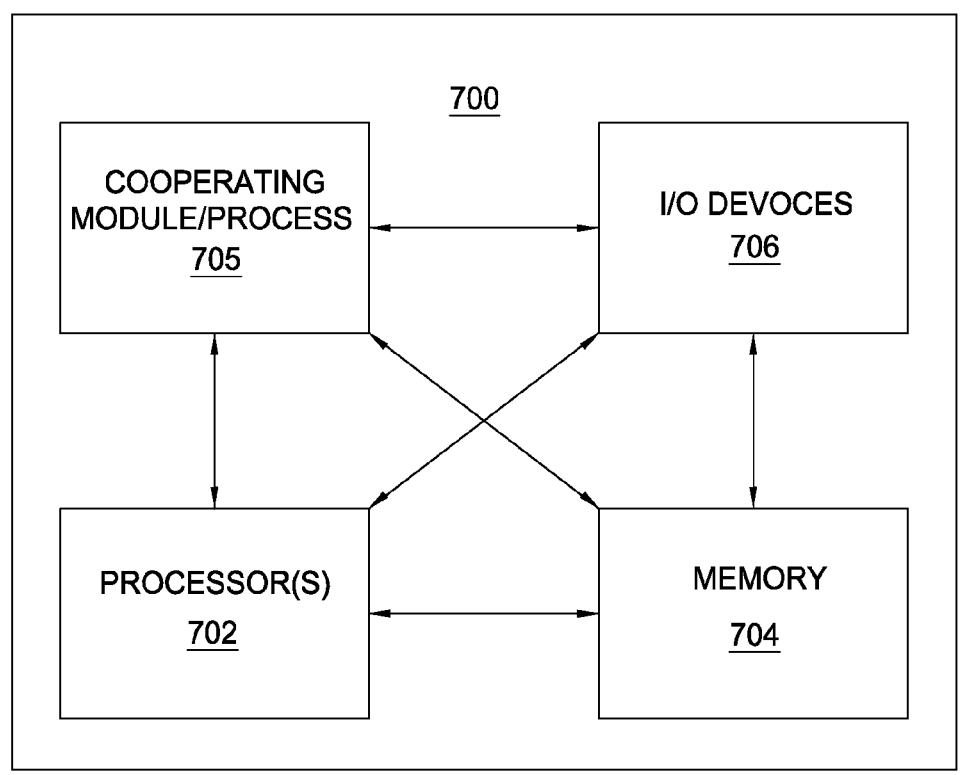
FIG. 7 depicts a high-level block diagram of a computer suitable for use in performing functions described herein.

FIG. 7 depicts a high-level block diagram of a computer suitable for use in performing functions described herein.

The computer 700 includes a processor 702 (e.g., a central processing unit (CPU) or other suitable processor(s)) and a memory 704 (e.g., random access memory (RAM), read only memory (ROM), and the like).

The computer 700 also may include a cooperating module/process 705. The cooperating process 705 can be loaded into memory 704 and executed by the processor 702 to implement functions as discussed herein and, thus, cooperating process 705 (including associated data structures) can be stored on a computer readable storage medium, e.g., RAM memory, magnetic or optical drive or diskette, and the like.

The computer 700 also may include one or more input/output devices 706 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 700 depicted in FIG. 7 provides a general architecture and functionality suitable for implementing functional elements described herein or portions of functional elements described herein. For example, computer 700 provides a general architecture and functionality suitable for implementing one of the nodes 112, a portion of one of the nodes 112, active gateway $120_A$, a portion of active gateway $120_A$, standby gateway $120_S$, a portion of standby gateway $120_S$, or the like.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., "or else" or "or in the alternative").

It will be appreciated that, while the foregoing is directed to various embodiments of features present herein, other and further embodiments may be devised without departing from the basic scope thereof.

What is claimed is:

1. An apparatus, comprising:
a processor and a memory communicatively connected to the processor, the processor configured to:
receive an original message at a first node configured to communicate via a set of token rings, the original message being received via a first token ring of the set of token rings, the original message having associated therewith one or more associated messages to be generated based on the original message, the one or more associated messages to be generated by a second node configured to communicate via the set of token rings, the one or more associated messages to be generated for, respectively, one or more other token rings of the set of token rings;
determine, at the first node based on the original message, the one or more other token rings for which the one or more associated messages are to be generated by the second node;
monitor, at the first node, for receipt of the one or more associated messages via, respectively, the one or more other token rings for which the one or more associated messages are to be generated by the second node; and
based on detection of a failure of the second node before at least one of the one or more associated messages has been received by the first node via, respectively, the one or more other token rings for which the one or more associated messages are to be generated by the second node, initiate distribution of the original message to the at least one of the one or more other token rings via which the at least one of the one or more associated messages has not been received by the first node.

2. The apparatus of claim 1, wherein the processor is configured to determine the one or more other token rings for which the one or more associated messages are to be generated by the second node based on one or more address fields of the original message.

3. The apparatus of claim 1, wherein the processor is configured to:
   delete the message from the memory in response to receipt of each of the one or more associated messages from, respectively, the one or more other token rings.

4. The apparatus of claim 1, wherein, to initiate distribution of the original message to the at least one of the one or more other token rings via which the at least one of the associated messages has not been received by the first node, the processor is configured to:
   generate at least one associated message, based on the original message, for the respective at least one of the one or more other token rings via which the at least one of the associated messages has not been received; and
   propagate the at least one associated message toward the respective at least one of the one or more other token rings via which the at least one of the associated messages has not been received by the first node.

5. The apparatus of claim 1, wherein the processor is configured to monitor for receipt of the one or more associated messages via the one or more other token rings based on a data structure comprising one or more entries associated with the respective one or more other token rings for which receipt of the one or more associated messages is monitored.

6. The apparatus of claim 5, wherein the processor is configured to:
   generate the one or more entries of the data structure associated with the one or more other token rings for which receipt of the one or more associated messages is monitored.

7. The apparatus of claim 5, wherein the processor is configured to:
   receive one of the one or more associated messages via a respective one of the one or more other token rings associated with one of the one or more entries; and
   remove, from the data structure, the one of the one or more entries associated with the one of the one or more other token rings via which the one of the one or more associated messages is received.

8. The apparatus of claim 5, wherein the processor is configured to:
   based on detection of a failure of the second node:
      determine whether any of the one or more entries remain within the data structure; and
      based on a determination that at least one of the one or more entries associated with at least one of the one or more other token rings remains within the data structure, initiate distribution of the original message to the at least one of the one or more other token rings associated with the at least one of the one or more entries remaining within the data structure.

9. The apparatus of claim 1, wherein the processor is configured to:
   based on detection of a failure of the second node:
      receive a second original message via the first token ring;
      determine a second token ring to which the second original message is to be provided;
      generate a corresponding second associated message for the second token ring based on the second original message; and
      propagate the second associated message toward the second token ring.

10. An apparatus, comprising:
    a processor and a memory communicatively connected to the processor, the processor configured to:
    receive, at a first node via a first token ring, an original message;
    determine, at the first node based on the original message, a second token ring to which the original message is to be provided by a second node, the second node providing the original message by generating an associated message based on the original message and providing the associated message to the second token ring;
    monitor, at the first node, the second token ring for receipt of the associated message;
    determine, based on detection of a failure of the second node, whether the associated message has been received by the first node via the second token ring; and
    initiate, by the first node based on a determination that the associated message has not been received by the first node via the second token ring, distribution of the original message to the second token ring.

11. A method, comprising:
    receiving an original message at a first node configured to communicate via a set of token rings, the original message being received via a first token ring of the set of token rings, the original message having associated therewith one or more associated messages to be generated based on the original message, the one or more associated messages to be generated by a second node configured to communicate via the set of token rings, the one or more associated messages to be generated for, respectively, one or more other token rings of the set of token rings;
    determining, at the first node based on the original message, the one or more other token rings for which the one or more associated messages are to be generated by the second node;
    monitoring, at the first node, for receipt of the one or more associated messages via, respectively, the one or more other token rings for which the one or more associated messages are to be generated by the second node; and
    based on detection of a failure of the second node before at least one of the one or more associated messages has been received by the first node via, respectively, the one or more other token rings for which the one or more associated messages are to be generated by the second node, initiating distribution of the original message to the at least one of the one or more other token rings via which the at least one of the one or more associated messages has not been received by the first node.

12. The method of claim 11, wherein the one or more other token rings for which the one or more associated messages are to be generated by the second node are determined based on one or more address fields of the original message.

13. The method of claim 11, further comprising:
    deleting the message from a memory of the first node in response to receipt of each of the one or more associated messages from, respectively, the one or more other token rings.

14. The method of claim 11, wherein initiating distribution of the original message to the at least one of the one or more other token rings via which the at least one of the associated messages has not been received by the first node comprises:
    generating at least one associated message, based on the original message, for the respective at least one of the one or more other token rings via which the at least one of the associated messages has not been received; and propagating the at least one associated message toward the respective at least one of the one or more other token rings via which the at least one of the associated messages has not been received by the first node.

15. The method of claim 11, wherein monitoring for receipt of the one or more associated messages via the one or more other token rings is based on a data structure comprising one or more entries associated with the respective one or more other token rings for which receipt of the one or more associated messages is monitored.

16. The method of claim 15, further comprising:
generating the one or more entries of the data structure associated with the one or more other token rings for which receipt of the one or more associated messages is monitored.

17. The method of claim 15, further comprising:
receiving one of the one or more associated messages via a respective one of the one or more other token rings associated with one of the one or more entries; and
removing, from the data structure, the one of the one or more entries associated with the one of the one or more other token rings via which the one of the one or more associated messages is received.

18. The method of claim 15, further comprising:
based on detection of a failure of the second node:
determining whether any of the one or more entries remain within the data structure; and
based on a determination that at least one of the one or more entries associated with at least one of the one or more other token rings remains within the data structure, initiating distribution of the original message to the at least one of the one or more other token rings associated with the at least one of the one or more entries remaining within the data structure.

19. The method of claim 11, further comprising:
based on detection of a failure of the second node:
receiving a second original message via the first token ring;
determining a second token ring to which the second original message is to be provided;
generating a corresponding second associated message for the second token ring based on the second original message; and
propagating the second associated message toward the second token ring.

20. A method, comprising:
receiving, at a first node via a first token ring, an original message;
determining, at the first node based on the original message, a second token ring to which the original message is to be provided by a second node, the second node providing the original message by generating an associated message based on the original message and providing the associated message to the second token ring;
monitoring, at the first node, the second token ring for receipt of the associated message;
determining, based on detection of a failure of the second node, whether the associated message has been received by the first node via the second token ring; and
initiating, by the first node based on a determination that the associated message has not been received by the first node via the second token ring, distribution of the original message to the second token ring.

* * * * *